Nov. 8, 1966          G. W. STANTON ET AL          3,284,541
COMPOSITIONS COMPRISING GRAFT COPOLYMERS ON POLYOLEFIN
SUBSTRATES OF ONE OR MORE MONOMERS OF THE GROUP
OF SULFONATED ACRYLATES AND METHACRYLATES
Filed June 22, 1962

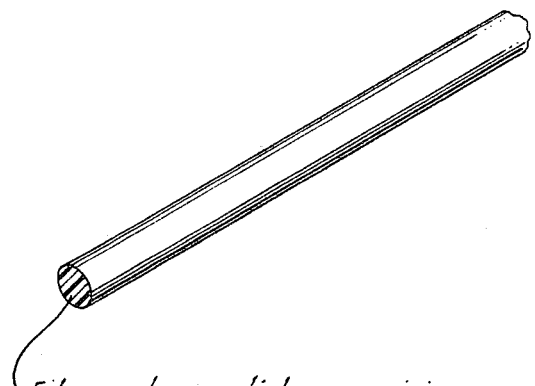

Filamentous article comprising a graft copolymer of certain sulfonated monomers on polyolefin polymer substrate.

INVENTORS.
George W. Stanton
BY Teddy G. Traylor

Griswold & Burdick
ATTORNEYS 3,284,541
COMPOSITIONS COMPRISING GRAFT COPOLYMERS ON POLYOLEFIN SUBSTRATES OF ONE OR MORE MONOMERS OF THE GROUP OF SULFONATED ACRYLATES AND METHACRYLATES
George W. Stanton, Walnut Creek, and Teddy G. Traylor, Del Mar, Calif., assignors to The Dow Chemical Company, Midland, Mich., a corporation of Delaware
Filed June 22, 1962, Ser. No. 206,126
6 Claims. (Cl. 260—878)

This application is a continuation-in-part of copending application for United States Letters Patent having Serial No. 711,942, filed January 29, 1958, now abandoned.

The present invention lies generally in the field of organic chemistry and contributes in particular to the art which pertains to synthetic, fiber-forming high polymers. More particularly, the present invention has reference to the provision of certain readily-dyeable graft or block-type copolymers that are comprised of certain sulfonated acrylate and methacrylate monomers, as hereinafter more fully delineated, polymerized on non-aromatic, hydrocarbon polyolefin polymer substrates which may hereinafter be more simply referred to as "polyolefin polymers" or merely as "polyolefins."

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Non-aromatic, hydrocarbon, polyolefin polymers may be utilized with great advantage for such purposes.

The polyolefin materials that are contemplated as being adapted for utilization as substrates in the practice of the present invention include any of the non-aromatic hydrocarbon olefin polymers, such as polyethylene, polypropylene and the like, that have been prepared from monomeric, non-aromatic hydrocarbon monoolefinic monomers containing from 2 to 8 carbon atoms in their molecule, such as ethylene, propylene, 4-methylpentene and the like. It is especially advantageous to utilize a polypropylene composition, particularly one of the fiber-forming variety, for this purpose. In this connection, it is generally desirable for the polyolefin that is employed to be one of the relatively more recent macromolecular, essentially linear high density species of polymers that have become available and which are generally characterized by their essentially linear unbranched stereospecific molecular configurations, and which may be made under the influence of such catalyst systems as have been described in Belgian Patent No. 533,362 (which are frequently known as being Ziegler-type catalysts). If desired, however, polyethylene may be utilized which is of the conventional, generally branch structured variety that has ordinarily been polymerized under relatively high pressures and is oftentimes referred to and known as being a "polythene."

Difficulty is often encountered in dyeing or coloring synthetic hydrophobic fibers and the like that have been prepared from non-aromatic, hydrocarbon olefin polymers. This is especially so when it is attempted to obtain relatively deeper shades of coloration in the finally dyed product.

Various techniques have been evolved for providing polyolefin compositions of improved dyeability. The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified polyolefin polymers. Also, such products, once they have been prepared, may not be as receptive as might be desired to a wide range of dyestuffs, due to inherent limitations in the materials capable of being employed for enhancing dye-receptivity.

It would be advantageous, and it is the chief aim and concern of the present invention, to provide non-aromatic, hydrocarbon polyolefins which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified polyolefin polymer substrates, and of the general order obtainable with polypropylene, for example. This would possibilitate the manufacture of non-aromatic, hydrocarbon polyolefin based fibers and the like articles having the highly desirable combination of attractive physical characteristics and substantial capacity for and acceptance of dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which is comprised or consists essentially of a non-aromatic, hydrocarbon polyolefin substrate having a minor proportion of substituents graft copolymerized thereto consisting essentially of polymerized sulfonated monomers of the varieties hereinafter particularized.

Schematically, the compositions may be structurally represented in the following manner:

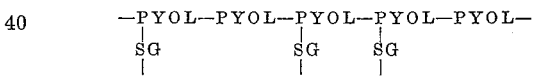

wherein the interlinked "PYOL" symbols represent the non-aromatic polyolefin polymer substrate or trunk and the symbols "SG" connected thereto the substituent graft copolymer branches of the indicated sulfonated acrylate and methacrylate monomers provided thereon.

As is apparent, the graft copolymer substituent that is combined with the polyolefin polymer substrate lends the desired receptivity of and substantivity for various dyestuffs to the compositions while the non-aromatic, hydrocarbon polyolefin polymer trunk substrate that is so modified facilitates and secures the excellent physical properties and characteristics of the various shaped articles, including fibers, into which the compositions may be fabricated. Advantageously, as mentioned, the polyolefin polymer substrate that is modified by graft copolymerization to provide the compositions of the invention is polypropylene, particularly that of the fiber-forming variety.

It is usually beneficial, as has been indicated, for the graft copolymer compositions of the present invention to contain a major proportion of the polyolefin polymer trunk or substrate that has been modified with the substituent dye-receptive graft copolymer groups chemically attached thereto. As a general rule, for example, it is desirable for the graft copolymer to be comprised of at least about 80 percent by weight of the polyolefin polymer substrate. In many instances, it may be satisfactory for the graft copolymer composition to be comprised of between about 85 and 95 percent by weight of the polyolefin polymer substrate, particularly when it is polypropylene. In this connection, however, better dyeability may generally be achieved when the grafted copolymeric substituents are prepared under such conditions that they have relatively long chain lengths. Thus, it is usually preferable, when identical quantities of grafted substituents are involved, for relatively fewer, but longer chain length grafts to be available than to have a greater number of substituents of relatively shorter chain length.

The sulfonated acrylate and methacrylate monomers which are utilized to modify non-aromatic hydrocarbon polyolefin substrates so as to provide the graft copolymer compositions of the present invention may be any of those selected from sulfonated acrylate and methacrylate monomers of the structural formula:

$$CH_2=CR-CO-Q-Y-(SO_3A)_n \qquad (I)$$

wherein R is selected from the group consisting of hydrogen and methyl, Q is selected from the group consisting of divalent sulfur (—S—), oxygen (—O—) and amide nitrogen (—NR—), Y is selected from the group consisting of bivalent and trivalent hydrocarbon radicals containing 1–4 carbon atoms, A is selected from the group consisting of hydrogen, alkali metals, and alkyl radicals containing 1–5 carbon atoms, and $n$ is an integer from 1–2.

Typical of the various sulfonated acrylate and methacrylate monomers that may be employed with benefit in the practice of the present invention are those included in the following tabulations, grouped according to general type, wherein the advantageous species are designated by the symbol (F):

TABLE 1.—TYPICAL SULFOALKYLACRYLATES OF THE FORMULA I 2-sulfoethylacrylate (F)
1-sulfoethylmethacrylate, sodium salt
2-sulfoethylmethacrylate, methyl ester
2-sulfoethylmethacrylate, potassium salt
3-sulfopropylacrylate, sodium salt (F)
1,3-disulfo 2-propanol ester of methacrylic acid

TABLE 2.—TYPICAL ACRYLOYL TAURINES OF THE FORMULA I

N-acryloyl taurine (F)
N-acryloyl taurine, sodium salt
N-methacryloyl taurine, methyl ester
N-methacryloyl taurine, potassium salt
N-acryloyl taurine, ethyl ester (F)
N-acryloyl-aminopropane sulfonic acid
N-methacryloyl-aminopropane sulfonic acid, sodium salt As is apparent, the sulfonated acrylate and methacrylate monomers may be utilized in the form of any of their alkali metal salts, particularly their sodium salts, or in the form of their esters or as free acids. If desired, the sulfonated monomers of the present invention may be utilized in combination or mixture with other varieties of monomers in order to prepare mixed graft copolymers having specific properties and effects, particularly with respect to their capability for accepting greater numbers of diverse types of dyestuffs. For example, the sulfonated monomers generally provide graft copolymers showing excellent acceptance of basic dyestuffs. However, other varieties of monomers such as those which may provide basic (alkaline) chemical characteristics in the resulting graft copolymer structure may frequently be used with great advantage to enhance the dye-receptivity of the resulting product to direct or acid types of dyestuffs. Such monomers as vinyl pyridine monomers, aminated vinyl aromatic monomers and aminated acrylate and methacrylate monomers may frequently be used in beneficial combination with the sulfonated monomers contemplated herein.

As mentioned, the graft copolymer compositions of the invention have remarkably good dye-receptivity, particularly in view of their polyolefin polymer origin. In most cases, for example, the dye-receptivity of the graft copolymer compositions of the present invention is improved to such an extent in comparison with unmodified polyolefin polymers, particularly unmodified polypropylene, that a color differential of at least about 40 Judd units, as hereinafter illustrated, may readily be obtained between samples of the unmodified polyolefin polymer substrate and the graft copolymer compositions of the present invention, each of which have been dyed at a 4 percent dyeing, according to conventional techniques with such a dyestuff as Sevron Brilliant Red 4G, a basic dyestuff formely known as Basic Red 4G. This is a significant advantage when the compositions are fabricated into shaped article form, especially when they are prepared in a filamentary form suitable for use as a textile material.

The Judd unit referred to in the foregoing is described and defined by D. B. Judd in an article in the "American Journal of Psychology," vol. 53, page 418 (1939). More applicable data appears in "Summary on Available Information on Small Color Difference Formulas" by Dorothy Nickerson in the American Dyestuff Reporter, vol. 33, page 252 (June 5, 1944). See also "Interrelation of Color Specifications" by Nickerson in the "Paper Trade Journal," vol. 125, page 153, for November 6, 1947.

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using vat, acetate, and naphthol dyes. Such dyestuffs, in addition to the particular variety mentioned, by way of didactic illustration, as Sulfanthrene Red 3B (Colour Index Vat Violet 2), Amacel Scarlet BS (American Prototype Number 244 and Colour Index Dispersed Red 1 or 11110), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the fiber products of the dye-receptive graft copolymer compositions of the invention include such basic dyes as Brilliant Green Crystals (Colour Index Basic Green 1); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BR Conc. (both Colour Index Dispersed Red 15), Celanthrene Pure Blue BRS 400 percent (Colour Index Dispersed Blue 1) and Acetamine Yellow N (Colour Index Dispersed Yellow 32); and B-Naphtol ←2-chloro-4-nitroaniline, an axoic dye.

The dyed products, especially textile fiber products, are generally lightfast and are well imbued with good resistance to crocking. In addition, dyed textile fiber products comprised of the compositions of the invention exhibit remarkable washfastness, despite repeated exposure and subjection to washing, laundering and dry cleaning treatments. A shaped filamentary article prepared from a dye-receptive composition in accordance with the present invention is schematically illustrated in the sole figure of the hereto annexed drawing.

The dye-receptive graft copolymers of the present invention may be prepared and provided by swelling or impregnating the polyolefin polymer substrate with the monomeric substance then polymerizing the monomer in situ in the substrate. Advantageously, this may be accomplished when the substrate is in the form of an already shaped article, such as a fiber of filamentary structure.

Beneficially, the graft copolymerization of the impregnated monomer may be accomplished and facilitated with the assistance of a polymerization catalyst or catalyzing influence, which preferentially interacts with the substrate in order to establish or form grafting sites thereon and simultaneously or subsequently initiate the graft copolymerization. As a practical matter, it is generally most desirable to form the graft copolymer compositions in such manner. Most of the free radical generating chemical catalysts, including peroxide and persulfate catalysts, and actinic radiations, including ultraviolet light, may be utilized for the desired graft copolymerization. It may often be exceptionally advantageous, however, to accomplish the graft copolymerization by subjecting the monomer-impregnated polyolefin polymer substrate to a field of high energy radiation in order to efficiently provide an effectively attached graft copolymer of the polymerized monomeric impregnate on the hydrophobic polyolefin polymer substrate. Excellent results may also be achieved by activating the polyolefinic polymer substrate prior to contact with the monomer so as to generate or create free radical sites upon the substrate to which the monomer may attach in order to form the graft polymerized substituents. Such activation, as is known, may be accomplished by means of pre-irradiation in fields of high energy radiation (including ultraviolet light) or by exposing the polyolefinic polymer substrate to the influence of oxygen (in the presence of ultraviolet light) or to already formed ozone prior to contact with the graft copolymer-forming monomer.

The monomer may be intimately impregnated in the polyolefin polymer substrate in any desired manner prior to the graft copolymerization. Thus, the monomer may be directly applied, particularly when it has a swelling effect on the substrate, or it may be applied from dispersion or solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the polyolefin polymer substrate with the latter being immersed in the bath for a sufficient period of time to attain a desired monomer content adequate for the intended purpose. The polyolefin polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of signficant advantage, however, to impregnate a preformed article, such as a textile fiber of the polyolefin polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20° and 60° C. utilizing relatively low dose rates and total dosages of the high energy for the desired purpose. Graft copolymerization on pre-activated substrates may ordinarily be accomplished by simply exposing the activated substrate to the monomer (preferably in concentrated solution) at an elevated temperature until the graft copolymerized substituents have formed on the substrate.

When the graft copolymer compositions are prepared from preformed or already shaped polyolefin polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the polyolefin substrate being modified in order to provide the compositions of the present invention. In addition, as has been indicated, particularly when preactivation of the substrate is performed, ultraviolet light may also be employed as the high energy radiation form including its use in combination with oxygen or ozone.

For purposes of specifically illustrating, without intending to thereby limit the invention, the following didactic examples are provided wherein, unless otherwise indicated, all parts and percentages are to be taken by weight.

*Example 1*

A sample of fine fibers of about 3 denier crystalline polypropylene was prepared by melt spinning a polymer having a molecular weight of about 100 thousand (as indicated by its melt viscosity). The fiber sample was treated with ozone for about 1 hour at a temperature of 25° C. The ozone was contained in the amount of 2–6 percent in a stream of oxygen. The ozone was obtained by passing oxygen through a 7,500 volt electric arc. The ozone-treated fiber sample was immersed in a solution of 25 percent ethylene diacrylate and 25 percent 2-sulfoethyl acrylate in 50 percent N-methyl pyrrolidone wherein it was heated for about 4 hours at 100° C. in order to form a graft copolymerized fiber product. After the treatment, the graft copolymerized product was washed thoroughly and then dyed for one hour at the boil in Sevron Brilliant Red 4G. A deep red shade of coloration was achieved. In contrast, the unmodified yarn could be dyed to only the faintest degree with the same dyestuff. The stick temperature and melting point of the graft copolymerized fiber product was found to be 170 and 180° C., respectively.

The dyeing with Sevron Brilliant Red 4G was performed at the 2 percent level according to the usual procedure in which the fiber sample was maintained for about one hour at the boil in the dyebath which contained the dyestuff in about an amount equal to about 2 percent of the weight of the fiber. The dyebath had a bath-to-fiber weight ratio of 30:1. After being dyed, the fiber was rinsed in water and dried for about 20 minutes at 80° C. The dye-receptivity of the Sevron Brilliant Red 4G-dyed fiber was evaluated spectrophotometrically by measuring the amount of monochromatic light having a wave length of about 520 millimicrons from a standard source that was reflected from the dyed sample. The numerical value obtained was taken along an arbitrarily designated scale from 0 to 100. This value represented the relative comparison of the light that was reflected from a standard white tile reflector that had a reflectance value of 316 by extrapolation from the 0 to 100 scale. Lower reflectance values are an indication of better dye-receptivity in the fiber. For example, a reflectance value of about 20 to 50 for polyolefin polymer fibers dyed with 2 percent Sevron Brilliant Red 4G is generally considered by those skilled in the art to represent a degree of dye-receptivity that readily meets or exceeds the most rigorous practical requirements and is ordinarily assured of receiving general commercial acceptance and approval. Ordinary unmodified polypropylene fibers of the same type used for the preparation of the graft copolymerized product generally have a reflectance value of about 120 on the same numerical scale. Thus, the improvement in dye-receptivity between the graft copolymerized fiber product of the present invention in comparison with unmodified polypropylene polymers was such that a color differential of about 40 Judd units was obtained between the dyed graft copolymer composition and the unmodified polypropylene fiber.

*Example 2*

The procedure of Example 1 was duplicated with the exception that the solution of mixed monomers in N-methyl pyrrolidone contained only 20 percent of each monomer. Commensurate excellent results were obtained.

*Example 3*

The procedure of Example 1 was duplicated with the exception that only about 15 percent of each monomer was employed in the mixed monomer solution in N-methyl pyrrolidone. Commensurate excellent results were also obtained. The stick temperature and melting point of the graft copolymerized fiber product was 150 and 157° C., respectively.

*Example 4*

The procedure of Example 1 was duplicated with the exception that N-methyl pyrrolidone solution of the mixed monomers used for treating the ozonated fiber contained 5 percent of ethylene diacrylate and 15 percent of the 2-sulfo ethyl acrylate. Very good dye-receptivity was achieved in the resulting graft copolymerized fiber product which had a stick temperature and melting point of 147 and 163° C., respectively.

Results similar to the foregoing may also be obtained when any other of the mentioned varieties of sulfonated monomers of the Formula I are utilized in a similar manner in place of those set forth in the above examples and when graft copolymers are prepared with such monomers on unfabricated forms of the polymer substrate, or when the monomers are utilized with other varieties of non-aromatic, hydrocarbon olefin polymers.

What is claimed is:

1. Dye-receptive graft copolymer composition composed of (1) a polyolefin of a 2 to 8 carbon atom, non-aromatic, monoolefin, said polyolefin having chemically attached thereto to carbon atoms in its chain, as graft copolymerized substituents thereon, a minor proportion of up to about 20 percent by weight, based on the weight of the composition, of units consisting of (2) a polymerized sulfonated monomer selected from the group consisting of sulfonated acrylate and methacrylate monomers of the structural formula:

$$CH_2=CR—CO—Q—Y—(SO_3A)_n \qquad (I)$$

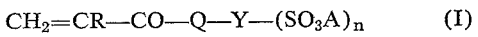

wherein R is selected from the group consisting of hydrogen and methyl, Q is selected from the group consisting of divalent sulfur, oxygen, and amide nitrogen, Y is selected from the group consisting of bivalent and trivalent hydrocarbon radicals containing 1–4 carbon atoms, A is selected from the group consisting of hydrogen, alkali metals, and alkyl radicals containing 1–5 carbon atoms, and $n$ is an integer from 1 to 2.

2. The composition of claim 1, wherein said polyolefin substrate has between about 5 and 15 percent by weight, based on the weight of the composition, of said graft copolymerized substituents attached thereto.

3. The composition of claim 1, wherein said polyolefin substrate is polypropylene.

4. The composition of claim 1, wherein said graft copolymerized substituents are a mixture of ethylene diacrylate and 2-sulfo-ethyl acrylate.

5. A filamentary article composed of the composition set forth in claim 1.

6. Method for the preparation of a dye-receptive graft copolymer which consists essentially of contacting a polymer of a 2 to 8 carbon atom, non-aromatic monoolefin with a sulfonated monomer selected from the group consisting of sulfonated acrylate and methacrylate monomers of the structural formula:

$$CH_2=CR—CO—Q—Y—(SO_3A)_n \qquad (I)$$

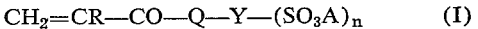

wherein R is selected from the group consisting of hydrogen and methyl, Q is selected from the group consisting of divalent sulfur, oxygen, and amide nitrogen, Y is selected from the group consisting of bivalent and trivalent hydrocarbon radicals containing 1–4 carbon atoms, A is selected from the group consisting of hydrogen, alkali metals, and alkyl radicals containing 1–5 carbon atoms, and $n$ is an integer from 1 to 2; then polymerizing said monomer in contact with said polymer until said monomer is graft copolymerized on said polymer.

References Cited by the Examiner

UNITED STATES PATENTS

| | | | |
|---|---|---|---|
| 2,914,499 | 11/1959 | Sheetz | 260—29.6 |
| 2,999,056 | 9/1961 | Tanner | 260—878 |
| 3,029,218 | 4/1962 | Murdock et al. | 260—885 |

MURRAY TILLMAN, *Primary Examiner.*

JAMES A. SEIDLECK, *Examiner.*

N. W. SHUST, W. L. BASCOMB, N. F. OBLON,
*Assistant Examiners.*